United States Patent Office 3,650,944
Patented Mar. 21, 1972

---

3,650,944
REFORMING PROCESS STARTUP
Charles S. McCoy, Orinda, and Willard M. Haunschild, Walnut Creek, Calif., assignors to Chevron Research Company, San Francisco, Calif.
No Drawing. Filed July 7, 1969, Ser. No. 839,717
Int. Cl. C10g 35/08, 39/00
U.S. Cl. 208—65                                    7 Claims

ABSTRACT OF THE DISCLOSURE

A reforming process involving a plurality of reactors in series containing a platinum group component catalyst is started up by contacting the feed with the catalyst in the presence of an inert gas at a temperature wherein the dehydrogenation reaction predominates, gradually increasing the temperature while adding a small amount of sulfur to the terminal reactor to control the temperature increase across the terminal reactor to below 5° F.

BACKGROUND OF THE INVENTION

Field

The present invention relates to hydrocarbon reforming processes and particularly to a method for starting up reforming processes conducted in the presence of a platinum group component catalyst.

Prior art

Catalytic reforming is well known in the petroleum industry and refers to the treatment of hydrocarbon feedstocks to improve the octane rating. In reforming, a number of reactions occur with each reaction being favored by a given set of conditions. The more important hydrocarbon reactions occurring during reforming operations employing catalysts comprising dehydrogenation-promoting metal components included dehydrogenation of naphthenes to aromatics, dehydrocyclization of paraffins to naphthenes and aromatics, isomerization of normal paraffins to isoparaffins, and hydrocracking of relatively long-chained paraffins to smaller chained paraffins. Catalysts comprising a platinum group component, e.g., platinum, in association with the porous solid carrier are used extensively for reforming. Generally the porous solid carrier is alumina. Recently it has been found that catalysts comprising platinum and rhenium in association with a porous solid carrier, e.g., alumina, possess exceptionally high activity and yield stability in the reforming of naphtha feeds. The platinum-rhenium catalyst is disclosed in U.S. Pat. 3,415,737.

It has been found beneficial in reforming to use a plurality of reactors in series with a provision for reheating hydrocarbon reactants between the reactors. The naphtha feed to be reformed is passed in contact with a catalyst in the first reaction zone at reforming conditions. The effluent stream is removed and reheated in an intermediate heating zone and then passed to a subsequent reactor. The effluent from the terminal reactor is generally passed to a separator or fractionator to recover a hydrogen-rich stream which is recycled to the reaction zone and a high octane gasoline product. Generally, the pressure employed in each reactor is decreased in the direction of hydrocarbon flow to avoid use of expensive compressors between reactor stages. The reactor inlet temperatures are dependent upon the feedstock, the composition, the feed hydrogen to hydrocarbon ratio, the reactant space velocity, type and distribution of catalyst between the several reactors, the degree of conversion desired, and the product selectivity desired in each reactor stage. An unequal distribution of catalyst is generally employed among the reactors.

In the first reactor, dehydrogenation of naphthenes to aromatics is the predominant reaction. Other reactions occurring to a lesser degree are the cracking of naphthenes and isomerization of paraffins. Because of the predominant dehydrogenation reaction, the first stage is highly endothermic. In the subsequent reactors, particularly in the terminal reactor, dehydrocyclization of paraffins to aromatics and hydrocracking of high molecular weight paraffins to low molecular weight paraffins predominate. The temperature drop in the second and subsequent reactors is generally lower than that of the first reactor since dehydrogenation is taking place to a lesser extent. While the temperature may drop slightly in the terminal reactor, it has been found in some situations that a small temperature exotherm exists.

Various methods for startup of a reforming process are disclosed in the prior art. It is generally desirable in starting up a reforming process to bring the catalyst, for example, a platinum group component-porous solid carrier, and reactant to elevated temperature as rapidly as possible without the production of a temperature excursion or exotherm in any of the reactor beds. A severe temperature excursion or heat front traveling through the catalyst bed when naphtha is initially contacting the catalyst in the presence of hydrogen could be the cause of a temperature runaway in a commercial plant. Such a temperature runaway could irreversibly damage the reactor and/or catalyst. Conventionally, reaction zones are brought onstream, as it is called, by passing hot hydrogen or hydrogen-rich gas through the reaction zone into contact with the catalyst until the entire reaction zone, including the catalyst, is at a desired temperature for the reforming reaction at which time the flow of the hydrogen-rich gas is continued and vaporized hydrocarbon feed is added thereto so as to cause the reforming of at least a portion of the feed.

While there is danger of a temperature excursion, e.g., in the terminal reactor, when using a catalyst comprising a platinum group component in association with a porous solid carrier, the problem of temperature runaway is particularly acute in starting up a reforming process using a catalyst comprising a platinum group component and rhenium component in association with a porous solid carrier. A catalyst comprising catalytically active amounts of platinum and rhenium supported on a porous solid carrier, e.g., alumina, while highly active and stable for reforming of naphtha fractions initially exhibits high demethanation activity. That is, the catalyst causes excessive hydrocracking when initially contacted with hydrogen and naphtha at reforming conditions; thus, large yields of hydrocarbon gases, e.g., methane and ethane, are produced during the early stages of reforming. As a consequence of the high demethanation activity of the platinum-rhenium catalyst, a severe temperature excursion or heat front could travel through the catalyst bed when naphtha is initially contacted with the catalyst in the presence of hydrogen at reforming conditions.

SUMMARY OF THE INVENTION

It has now been found that a reforming process involving a pluarlity of at least three reactors in series containing a platinum group component catalyst, particularly a platinum group component-rhenium component catalyst, the catalyst preferably being in an unsulfided state, can be started up by:

(1) Passing an inert gas throughout the plurality of reactors in contact with the catalyst;
(2) Heating the catalyst to a level where the predominant reaction which can take place is dehydrogenation;
(3) Passing a substantially sulfur-free naphtha feed in contact with the catalyst in the plurality of reactors thereby affecting the dehydrogenation of hydrocarbons to produce hydrogen;

(4) Withdrawing a mixture of naphtha and inert gas along with any produced hydrogen from the reactors;

(5) Introducing a sulfur compound separately into the last and the next-to-the-last reactors in an amount less than about 0.5 mole sulfur per mole of the platinum group component and rhenium present on the catalyst, calculated as the metals; and (6) Decreasing the flow of inert gas throughout the plurality of reactors while building up the hydrogen concentration and adjusting the pressure and temperature conditions for a reforming operation to produce higher octane product than in the predominantly dehydrogenation reaction.

The present startup procedure for a reforming process using a plurality of reactors in series permits rapidly bringing the catalyst and reactants to an elevated temperature without a temperature excursion in any of the reactors, particularly in the terminal reactor. Furthermore, the procedure of the present invention permits startup without the introduction of excessive amounts of sulfur, which sulfur can be damaging to the reforming characteristics of the platinum group component catalyst, particularly a catalyst comprising platinum and rhenium.

DESCRIPTION OF THE INVENTION

The reforming process using a plurality of reactors containing catalyst comprising a platinum group component is started up by means of an inert gas with the use of sulfur or a compound of sulfur in the terminal reactors. The present startup procedure for bringing a reforming process onstream is applicable with freshly prepared catalyst as well as with used catalyst which has been subsequently regenerated, e.g., by heating in an oxygen atmosphere. It is preferred, however, for purposes of the present invention that the catalyst exist in an unsulfided state prior to contact with the naphtha in the presence of the inert gas. Particularly, it is preferred that the catalyst be contacted at an elevated temperature with a reducing atmosphere free of hydrocarbons, e.g., pure hydrogen, prior to contact with the naphtha. The high temperature treatment in a hydrogen atmosphere can be accomplished at a temperature in the range of 600 to 1300° F. and preferably 600 to 1000° F.

The catalyst employed in the reforming operation comprises a platinum group component in association with a porous solid carrier. Generally the platinum group component will be present in an amount of from 0.01 to 3 weight percent. The platinum group component includes all the members of Group VIII of the Periodic Table having an atomic weight greater than 100 as well as compounds and mixtures of any of these. Thus, the platinum group component is selected from platinum, palladium, iridium, ruthenium, rhodium and osmium. The weight percent of the platinum group component is calculated as the metal; however, the platinum group component can exist as metal, or compound thereof, or mixtures of metal and compound on the porous solid carrier.

As a particular embodiment of the present invention, the catalyst comprises a platinum group component and rhenium in association with a porous solid carrier. Generally, the rhenium will be present in an amount of from 0.01 to 5 weight percent and preferably from 0.1 to 2 weight perecnt. Regardless of the form in which rhenium exists on the catalyst, whether as metal or compound, the weight percent is calculated as the metal. As indicated, rhenium significantly improves the yield stability of the platinum-containing catalyst; thus a process using a platinum-rhenium catalyst has a significantly lower yield decline throughout the reforming process than a catalyst comprising platinum without rhenium. However, the catalyst also has a high initial hydrocracking activity which raises the possibilty of a temperature excursion or runaway when the catalyst is first contacted with the naphtha.

The porous solid carrier used with the catalyst generally is a porous inoragnic oxide, particularly an inorganic oxide having a surface area of 50 to 750 m.$^2$/gm. and more preferably 150 to 750 m.$^2$/gm. Typical acidic inoragnic oxide supports which can be used are the naturally occurring aluminum silicates, particularly when acid treated to increase the activity, and the synthetically produced cracking supports, such as silica-alumina, silica-zirconia, silica-alumina-zirconia, silica-magnesia, silica-alumina-magnesia, and crystalline zeolitic aluminosilicates.

It is preferred, however, that the catalyst possess low cracking activity, that is, possess limited acidity. Thus, it is particularly preferred that alumina be present. Any of the forms of alumina suitable as a support for reforming catalysts can be used. Furthermore, alumina can be prepared by a variety of methods for purposes of this invention. Thus, the alumina can be prepared by adding a suitable alkaline agent, such as ammonium hydroxide, to a salt of aluminum, such as aluminum chloride, aluminum nitrate, etc., in an amount to form aluminum hydroxide which on drying and calcining is converted to alumina. Alumina may also be prepared by the reaction of sodium aluminate with a suitable reagent to cause precipitation thereof with the resulting formation of alumina hydroxide gel. Also, alumina may be prepared by the reaction of metallic aluminum with hydrochloric acid, acetic acid, etc., in order to form a hydrosol which can be gelled with a suitable precipitating agent, such as ammonium hydroxide, followed by drying and calcination. The catalyst comprising the platinum group component can be prepared in a variety of methods; that is, the platinum group component can be associated with the porous solid carrier by impregnation, ion-exchange, coprecipitation, etc. Generally it is preferred to incorporate the platinum group component by impregnation. When rhenium is incorporated along with platinum group component, the rhenium component can also be associated with the carrier by various techniques, e.g., impregnation, ion-exchange, coprecipitation, etc. Preferably the platinum group component and rhenium component are associated with the carrier by impregnation, either simultaneously or sequentially. Particularly preferred platinum group components for use in impregation include chloroplatinic acid, ammonium chloroplatinates, polyammineplatinum salts, palladium chloride, etc. Suitable rhenium components are perrhenic acid, ammonium or potassium perrhenates, etc.

In the present process the reaction conditions, particularly the temperature, in the reforming zones are initially maintained at levels where predominantly dehydrogenation reactions occur. The reaction conditions are adjusted to permit dehydrogenation to occur since it is desirable to produce some hydrogen without subjecting the hydrocarbon oil to reactions such as, for example, hydrocracking and/or dehydrocyclization. Generally, the reactors containing the catalyst are pressured to about 200 p.s.i.g. with an inert gas. Thereafter the temperature in the reactor, that is, the catalyst temperature, is raised to around 600 to 750° F. Generally the catalyst is heated to an elevated temperature during the time the reactors are being pressured with inert gas. However, it is contemplated that the pressuring of the reactors and the heating of the catalyst need not occur simultaneously. Thus, the reactors can be brought to a pressure of about 200 p.s.i.g. and the catalyst heated to desired temperatures. The inert gas is generally used as the medium to heat the catalyst to the proper temperature where dehydrogenation reactions predominate; that is, the inert gas is heated to an elevated temperature prior to introduction into the reaction zone. The inert gas removed at the outlet of one reactor is passed to the inlet of the next reactor; inert gas from the outlet of the terminal reactor is generally recycled to the inlet of the first reactor.

The inert gas should be essentially free of hydrogen and other reactive gases such as oxygen. Thus, the reactor should be pressured with a gas which is at least 95 volume percent inert. The inert gas used in the present process should be one which has little or no effect upon the reforming operation; that is, it does not react with the hydrocarbon oil or poison the catalyst to the extent that its use is undesirable. Inert gas which can be used for this purpose include argon, nitrogen, methane, and flue gas resulting from the combustion of carbonaceous material with oxygen containing gas, etc. Nitrogen is preferably used as the inert gas in the present process.

After the catalyst temperature and pressure are at the desired levels and inert gas is circulating through the reactors in contact with the catalyst, the naphtha feed is introduced in contact with the catalyst. The naphtha to be employed is a light hydrocarbon oil. Generally, the naphtha will boil within the range of from 70 to 500° F. and preferably from 150 to 450° F. Thus, the feed can be, for example, either a straight-run naphtha or a hydrofined naphtha, or blends thereof. The feed is preferably essentially sulfur free; that is, the feed preferably contains less than about 10 p.p.m. sulfur, more preferably less than about 1 p.p.m. sulfur and still more preferably less than about 0.1 p.p.m. sulfur. Sulfur in the feed has been found to have a deleterious effect on the reforming characteristics of the platinum-rhenium catalysts. If need be, the feedstock should be hydrodesulfurized prior to introduction into contact with the catalyst. The naphtha feed is generally heated to the temperature of the catalyst prior to introduction into contact with the catalyst. Thus, the naphtha will be heated to a temperature within the range of 600 to 750° F.

It is generally preferred that the naphtha be introduced into the reaction in contact with the catalyst at a low space velocity, e.g., a space velocity of about 1 v./v./hr., in order to maintain a high inert gas to feed ratio. The high inert gas to feed ratio is desirable since the inert gas helps dissipate heat which is produced by hydrocracking or other exothermic reactions. The dissipation of heat helps prevent further, uncontrollable hydrocracking, which could lead to temperature runaway. The inert gas and naphtha are passed from one reactor to another usually with intermediate heating; the effluent from the terminal reactor is passed to a gas separation zone to separate naphtha from the inert gas into an inert gas which is generally recycled to the first or subsequent reactors.

At the conditions existing in the reforming zone when the naphtha is contacted with the catalyst, the naphthenes contained in the naphtha are dehydrogenated to a limited extent to produce hydrogen. Thus, endothermic reactions are favored while exothermic or heat producing reactions are minimized. The temperature during the time the feed is contacted with the catalyst should be carefully controlled so that it is high enough to permit sufficient dehydrogenation of naphthenes to produce hydrogen but not so high as to subject the naphtha feed to excessive hydrocracking or to reactions which are adversely influenced in the absence of hydrogen or in the presence of only small quantities thereof. Generally naphtha feed is introduced into circulating nitrogen at a reaction condition such that no appreciable reaction takes place. Then the temperature in the reaction zone is slowly increased until dehydrogenation reactions start. As there is essentially no hydrogen present, the tendency for hydrocracking is self-limiting and the system cannot run away. If necessary, the reaction temperature can be cut back to insure against the runaway reactions.

After contacting the naphtha with the catalyst at, preferably, a low space rate and at low catalyst temperatures, the temperatures of the catalyst in the reactors are raised at a generally uniform rate over a period of several hours. The temperature is increased to bring the reaction zones to normal reforming reaction temperatures. At the same time the catalyst temperature is being increased, the naphtha feed rate to the reactors can then be increased to that of the desired reforming rate. Generally the temperature of the catalyst is raised from, say, 650° F. to 900° F. in from 2 to 3 hours, and the liquid hourly space velocity is increased from 1 v./v./hr. to 2 v./v./hr. in the same length of time.

When the naphtha is contacted with the catalyst at the low pressure and temperature, a limited amount of hydrogen is produced from, for example, the dehydrogenation of naphthenes.

Consequently, a reaction product is discharged from the reforming zone comprised of normally liquid material and a gaseous material containing hydrogen and inert gas. The naphtha and inert gas along with any produced hydrogen are treated in a gas separation zone to recover inert gas and hydrogen from the naphtha; the inert gas and hydrogen are recycled to the reactors.

Over the period of time during which the temperature is gradually raised to normal reforming temperature, hydrogen is produced in increasingly greater amounts. Thus, circulating produced hydrogen to the reaction zones results in a gradual increase in the hydrogen partial pressure. Part of the recycle gas, i.e., inert gas, and hydrogen and any light hydrocarbon gases, such as methane, present in the recycle gas are continuously discharged from the system to gradually remove substantially all the inert gas. The rate of discharge is not permitted to exceed the rate at which hydrogen is produced. If desired, the pressure can be increased considerably be buildup of autogenous pressure of produced hydrogen. The discharge of gaseous material from a system is continued at least until the hydrogen concentration is sufficient for use in the desired reforming operation. The inert gas in the recycle stream and in the reactor should be decreased to less than about 10 volume percent and preferably less than about 5 volume percent of the total recycle stream.

In the last two reactors in series of a reforming system comprising a plurality of at least three reactors a temperature excursion could possibly occur even during the startup using carefully controlled amounts of inert gas. Thus, the temperature excursion could lead to further hydrocracking or exothermic reactions which could possibly result in a temperature runaway. Thus, in the terminal reactors, that is, the last two reactors, of a reforming system comprising a plurality of at least three reactors in series, sulfur or a compound of sulfur is added in an amount less than about 0.5 mole of sulfur per mole of the metal components present on the catalyst, calculated as the metals. Suitable sulfur compounds include $H_2S$ or sulfur compounds which convert to $H_2S$ at elevated temperatures and pressures in the presence of hydrogen. Thus, for example, dimethyldisulfide can be used and in particular it is a preferred sulfur compound. Other sulfur compounds include light mercaptans and dimethylsulfide. Preferably a sulfur compound is added to the reactors in an amount such that less than about 0.1 mole of sulfur per mole of the metal components present on the catalyst, calculated as the metals, is added. The small amount of sulfur added is sufficient generally to curb the temperature exotherm without introducing extraneous sulfur which could have a deleterious effect on the catalyst. Greater amounts than about 0.5 mole of sulfur per mole of metal components on the catalyst could lower the activity and yield stability of the catalyst, particularly of a platinum-rhenium catalyst, in the subsequent reforming process at the elevated temperatures and pressures. Generally, the temperatures increase through the catalyst bed in the last two reactors is monitored and when the temperature at the outlet of the reactor exceeds 5° F. over that of the temperature at the inlet of the reactor, i.e., the $\Delta T$ through the catalyst bed is greater than 5°, the small amount of sulfur is added to control the $\Delta T$ to less than 5° F.

The introduction of the sulfur or sulfur compound to the last two reactors and particularly to the terminal reactor is accomplished during the time that the catalyst temperature in the reactors is being raised from the level where predominantly dehydrogenation reactions occur to the temperature normally desired in reforming. The sulfur may be added during the time the flow of inert gas is being decreased while the hydrogen partial pressure is being increased. At any rate the addition of sulfur occurs before the reforming system is onstream and operating at the desired temperature, e.g., 900° F.

After the startup procedure the reforming process can be operated at any particularly desired reforming conditions, for example, the reforming temperature may be within the range of 600 to 1000° F., preferably from 700 to 1050° F. and more preferably from 850 to 1050° F. The pressure in the reforming reaction zones can be superatmospheric, atmospheric or subatmospheric; the pressure will generally lie within the range of 25 to 1000 p.s.i.g. and preferably from 50 to 750 p.s.i.g. The temperature and pressure can be correlated with the liquid hourly space velocity to favor any particularly desirable reforming reactions, e.g., aromatization or isomerization. In general, the LHSV will be from 0.1 to 10 and preferably from 1 to 5. The hydrogen to hydrocarbon mole ratio is preferably from about 0.5 to 20.

The startup procedure of the present invention was used in a commercial operation. Nitrogen gas was circulated through the catalytic reformers (plurality of three reactors in series); the temperature in the reaction zone containing a catalyst comprising 0.3 weight percent platinum and 0.3 weight percent rhenium in association with alumina was raised to the point just below where dehydrogenation reactions occur. Thereafter feed was introduced into the reaction zones, and the temperature gradually increased. Nitrogen and produced hydrogen were recycled to the reaction zones. When the reactor inlet temperature in the last reaction zone reached about 750° F., a temperature exotherm was observed. This was corrected by the addition of a total of 600 milliliters of carbon disulfide directly to the last reactor. The sulfur addition was equal to a total of 1.4 pounds of sulfur, or a pound of sulfur per 3700 pounds of catalyst. The reactor temperatures were gradually raised to the temperature normally desirable for reforming, i.e., above about 900° F. Octane of the product was about 87.5 F–1 clear. During the gradual increase in temperature with the concurrent higher rate of production of hydrogen, the nitrogen flow through the reaction zone was decreased.

The foregoing disclosure of this invention is not to be considered as limiting since many variations can be made by those skilled in the art without departing from the scope or spirit of the appended claims.

We claim:

1. In a process for reforming a substantially sulfur-free naphtha feed with a catalyst comprising 0.01 to 3 weight percent of a platinum group component and 0.01 to 5 weight percent of a rhenium component associated with a porous solid carrier in a plurality of at least three reactors in series at reforming conditions and in the presence of hydrogen, the method of startup of said process which comprises:
   (1) passing an inert gas throughout the plurality of reactors in contact with the catalyst;
   (2) heating the catalyst to a level where the predominant reaction which can take place is hydrocarbon dehydrogenation;
   (3) passing inert gas and a substantially sulfur-free naphtha feed in contact with the catalyst in the plurality of reactors thereby affecting the dehydrogenation of hydrocarbons to produce hydrogen;
   (4) withdrawing a mixture of naphtha and inert gas along with any produced hydrogen from the reactors;
   (5) introducing a sulfur compound separately into only the last and the next-to-last reactors to prevent the temperature exotherms through the last reactor bed or the next-to-last reactor bed from increasing above about 5° F., said sulfur compound being in an amount less than about 0.5 mole sulfur per moles of the platinum group component and rhenium present on the catalyst, calculated as the metals;
   (6) thereafter decreasing the flow of inert gas throughout the plurality of reactors while building up the hydrogen concentration and adjusting the pressure and temperature conditions for a reforming operation to produce higher octane product than in the predominantly dehydrogenation reaction.

2. The process of claim 1 wherein the platinum group component is platinum.

3. The process of claim 1 wherein said porous solid carrier is a porous inorganic oxide.

4. The process of claim 3 wherein said porous inorganic oxide is alumina.

5. The process of claim 1 wherein sulfur is introduced only into the last reactor of a three-reactor system.

6. In the startup of a process for reforming a substantially sulfur-free naphtha feed containing naphthenes using a catalyst comprising 0.01 to 3 weight percent of a platinum group component and 0.01 to 5 weight percent of a rhenium component associated with a porous inorganic oxide using a plurality of at least three reactors in series at reforming conditions and in the presence of hydrogen and wherein an inert gas is passed in contact with the catalyst prior to and during the initial stages of contact of the naphtha with the catalyst at a low temperature and pressure where the predominant reaction which takes place is dehydrogenation of naphthenes, the temperature and pressure gradually being increased to conditions wherein other reforming reactions occur to a significant extent while decreasing the flow of inert gas through the reactors as the hydrogen concentration is increased, the improvement which comprises introducing sulfur in an amount less than about 0.1 mole of sulfur per mole of the platinum group component and rhenium component present on the catalyst, calculated as the metals, only into the last reactor or the last and next-to-last reactors to prevent the temperature exotherms through the last reactor bed or the next-to-last reactor bed from increasing above about 5° F.

7. In the startup of a process for reforming a substantially sulfur-free naphtha feed containing naphthenes using a catalyst comprising 0.01 to 3 weight percent of a platinum group component and 0.01 to 5 weight percent of a rhenium component associated with a porous inorganic oxide using a plurality of at least three reactors in series at reforming conditions and in the presence of hydrogen and wherein an inert gas is passed in contact with the catalyst prior to and during the initial stages of contact of the naphtha with the catalyst at a low temperature and pressure where the predominant reaction which takes place is dehydrogenation of naphthenes, the temperature and pressure gradually being increased to conditions wherein other reforming reactions occur to a significant extent while decreasing the flow of inert gas through the reactors as the hydrogen concentration is increased, the improvement which comprises adding sulfur in an amount less than about 0.1 mole of sulfur per mole of the platinum group component and rhenium component present on the catalyst, calculated as the metals, only to the last reactor or the last and next-to-last reactors when the temperature increase through the last reactor catalyst bed or the next-to-last reactor catalyst bed exceeds about 5° F.

References Cited
UNITED STATES PATENTS

| | | | |
|---|---|---|---|
| 3,449,237 | 6/1969 | Jacobson et al. | 208—138 |
| 2,880,162 | 3/1959 | Moore | 208—65 |
| 2,895,898 | 7/1959 | Brooks et al. | 208—65 |
| 3,415,737 | 12/1968 | Kluksdahl | 208—138 |
| 3,424,669 | 1/1969 | Carter et al. | 208—65 |

HERBERT LEVINE, Primary Examiner

U.S. Cl. X.R.

208—138